United States Patent
Jin et al.

(10) Patent No.: US 11,520,504 B2
(45) Date of Patent: Dec. 6, 2022

(54) DATA STORAGE DEVICE AND OPERATING METHOD THEREOF

(71) Applicant: SK hynix Inc., Icheon (KR)

(72) Inventors: Yong Jin, Icheon (KR); Seung Won Jeon, Icheon (KR); In Hyuk Park, Icheon (KR); Yoon Jo Oh, Icheon (KR)

(73) Assignee: SK hynix Inc., Icheon (KR)

( * ) Notice: Subject to any disclaimer, the term of this patent is extended or adjusted under 35 U.S.C. 154(b) by 72 days.

(21) Appl. No.: 17/027,598

(22) Filed: Sep. 21, 2020

(65) Prior Publication Data

US 2021/0318820 A1  Oct. 14, 2021

(30) Foreign Application Priority Data

Apr. 9, 2020  (KR) ................. 10-2020-0043401

(51) Int. Cl.
  *G06F 12/00*  (2006.01)
  *G06F 3/06*   (2006.01)
  *G06F 12/02*  (2006.01)
  *G06F 12/06*  (2006.01)

(52) U.S. Cl.
  CPC ............ *G06F 3/0631* (2013.01); *G06F 3/061* (2013.01); *G06F 3/0604* (2013.01); *G06F 3/0644* (2013.01); *G06F 3/0656* (2013.01); *G06F 3/0658* (2013.01); *G06F 3/0673* (2013.01); *G06F 3/0679* (2013.01); *G06F 12/0246* (2013.01); *G06F 12/0607* (2013.01)

(58) Field of Classification Search
  CPC ...... G06F 3/0631; G06F 3/0604; G06F 3/061; G06F 3/0644; G06F 3/0656; G06F 3/0658; G06F 3/0673; G06F 3/0679; G06F 12/0246; G06F 12/0607; G11C 16/10
  See application file for complete search history.

(56) References Cited

U.S. PATENT DOCUMENTS

| | | | | |
|---|---|---|---|---|
| 2014/0122861 | A1* | 5/2014 | El Maghraoui | G06F 12/0246 713/100 |
| 2018/0260154 | A1* | 9/2018 | Dronamraju | G06F 3/0605 |
| 2019/0384517 | A1* | 12/2019 | Lin | G06F 3/0679 |
| 2020/0183852 | A1* | 6/2020 | Hale | G06F 12/0238 |
| 2020/0264780 | A1* | 8/2020 | Franciosi | G06F 9/5016 |
| 2020/0409589 | A1* | 12/2020 | Bennett | G06F 3/0688 |

(Continued)

FOREIGN PATENT DOCUMENTS

| | | |
|---|---|---|
| KR | 20130112755 A | 10/2013 |
| KR | 20190105414 A | 9/2019 |

*Primary Examiner* — John A Lane

(57) ABSTRACT

A data storage device includes a storage including a buffer zone and a data zone and a controller for exchanging data with the storage by allocating at least one zone namespace (ZNS) in the data zone, a ZNS being a data storage region that is physically and logically divided and allocated to each of application programs driven in a host. The controller opens one or more sub buffer zones in the buffer zone, divides write data from the host into one or more segments respectively corresponding to sizes of the one or more sub buffer zones, buffers each of the one or more segments in a corresponding one of the one or more sub buffer zones, opens a ZNS corresponding to a length of the write data in the data zone, and migrates the one or more segments buffered in the sub buffer zones to the opened ZNS.

16 Claims, 9 Drawing Sheets

(56) References Cited

U.S. PATENT DOCUMENTS

2021/0157720 A1* 5/2021 Bert ...................... G06F 3/0608
2021/0182166 A1* 6/2021 Hahn .................... G06F 3/0688
2021/0255803 A1* 8/2021 Kanno .................. G06F 3/0631
2021/0303188 A1* 9/2021 Bazarsky .............. G06F 3/0604
2021/0326048 A1* 10/2021 Karr ..................... G06F 3/0683

* cited by examiner

DATA STORAGE DEVICE AND OPERATING METHOD THEREOF

CROSS-REFERENCES TO RELATED APPLICATION

The present application claims priority under 35 U.S.C. § 119(a) to Korean Patent Application Number 10-2020-0043401, filed on Apr. 9, 2020, in the Korean Intellectual Property Office, which is incorporated herein by reference in its entirety.

BACKGROUND

1. Technical Field

Various embodiments relate to a semiconductor integrated device, and more particularly, to a data storage device and an operating method thereof.

2. Related Art

A data storage device is coupled to a host to perform data input and output operations in response to a request of the host.

A garbage, which is inevitably wasted while storing or deleting data in or from a data storage device, may be collected through garbage collection. The garbage collection may cause an internal write operation of the data storage device.

With development of industries related to artificial intelligence (AI) and big data, researches into high-performance data centers have been actively conducted. Data centers may be implemented to drive a large number of operating systems and/or application programs using a hardware pool represented by data storage devices.

A zoned namespace (ZNS) concept has been introduced to provide high performance without interference between a plurality of operating systems and between a plurality of application programs in a multi-tenant data center.

According to the ZNS concept, a plurality of application programs sequentially store data in zones respectively allocated thereto. The zones may be physically and logically divided spaces, and similar data may be collected and sequentially stored in each of the zones and erased in zone units. Therefore, it is possible to avoid performance degradation due to garbage collection.

In a ZNS type data storage device, a size of data provided by a host, i.e., a size of zone data, may be varied. Therefore, there is a need for a method capable of flexibly writing data depending on a workload of the host.

SUMMARY

In an embodiment of the present disclosure, a data storage device may include: a storage including a buffer zone and a data zone; and a controller configured to exchange data with the storage by allocating at least one zone namespace (ZNS) in the data zone of the storage, a ZNS being a data storage region that is physically and logically divided and allocated to each of a plurality of application programs driven in a host, wherein the controller is configured to: open one or more sub buffer zones in the buffer zone of the storage; divide write data transmitted from the host into one or more segments respectively corresponding to sizes of the one or more sub buffer zones; buffer each of the one or more segments of the write data in a corresponding one of the one or more sub buffer zones; open a ZNS corresponding to a length of the write data in the data zone of the storage; and migrate each of the one or more segments buffered in the one or more sub buffer zones to the opened ZNS.

In an embodiment of the present disclosure, an operating method of a data storage device which includes a controller and a storage including a buffer zone and a data zone, the controller configured to exchange data with the storage by allocating at least one zone namespace (ZNS) in the storage, a ZNS being a data storage region that is physically and logically divided and allocated to each of a plurality of application programs driven in a host, the method comprising: receiving a write request including write data of an application program from the host; opening one or more sub buffer zones in the buffer zone of the storage in response to the write request; dividing the write data into one or more segments respectively corresponding to sizes of the one or more sub buffer zones; buffering the one or more segments of the write data in the one or more sub buffer zones; opening a ZNS corresponding to a length of the write data in the data zone of the storage; and migrating the one or more segments buffered in the one or more sub buffer zones to the opened ZNS.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention are described in greater detail below with reference to the accompanying drawings. However, features and aspects of the present invention may be configured or arranged differently than disclosed herein. Thus, the present invention is not limited to the disclosed embodiments. Rather, the present invention encompasses all modifications and variations of any of the disclosed embodiments that fall within the scope of the claims. Also, throughout the specification, reference to "an embodiment" or the like is not necessarily to only one embodiment, and different references to any such phrase are not necessarily to the same embodiment(s).

Figure 1:
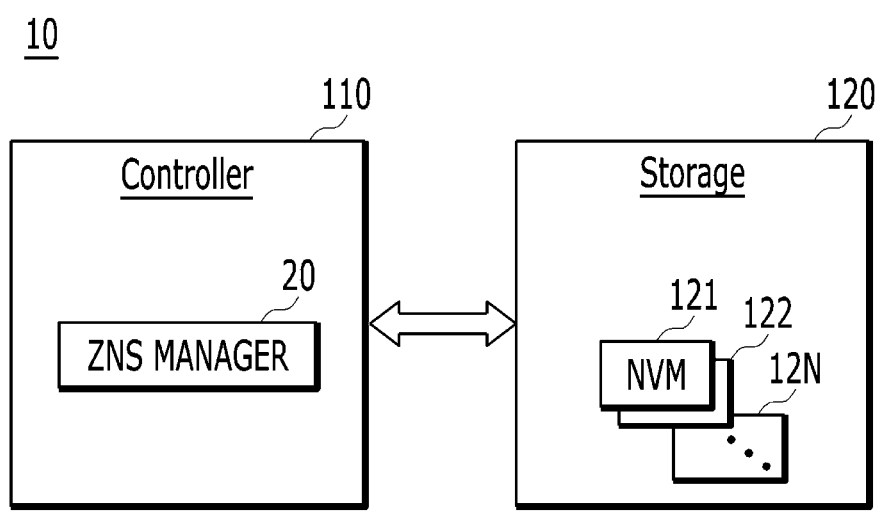
FIG. 1 is a diagram illustrating a data storage device according to an embodiment of the present disclosure.

FIG. 1 is a diagram illustrating a data storage device 10 according to an embodiment.

Referring to FIG. 1, the data storage device 10 may include a controller 110 and a storage 120.

The controller 110 may control the storage 120 in response to a request of a host (not shown) in which a plurality of application programs are driven. For example, the controller 110 may control data to be stored in the storage 120 by allocating a zoned namespace (ZNS) into the storage 120 according to each of the plurality of application programs that provides its own write data in response to a write request of the host. The controller 110 may provide data written in the storage 120 to the host in response to a read request of the host. In an embodiment, the controller 110 may include a ZNS manager 20.

A ZNS may be a region physically and logically divided to store data according to each of the plurality of application programs driven in the host. Each of the plurality of application programs may sequentially store data in a ZNS allocated thereto.

The storage 120 may store data or output stored data under the control of the controller 110. The storage 120 may be configured of a volatile memory device or a nonvolatile memory device. In an embodiment, the storage 120 may be implemented using a memory device selected from among various nonvolatile memory devices such as an electrically erasable and programmable read only memory (EEPROM), a NAND flash memory, a NOR flash memory, a phase-change random access memory (PRAM), a Resistive RAM (ReRAM), a ferroelectric RAM (FRAM), a spin torque transfer magnetic RAM (STT-MRAM), and the like.

The storage 120 may include a plurality of nonvolatile memory devices (NVMs) 121 to 12N, and each of the nonvolatile memory devices 121 to 12N may include a plurality of dies, a plurality of chips, or a plurality of packages, N being a positive integer. The storage 120 may have a single-level cell (SLC) structure configured to store 1-bit data in one memory cell or a multi-level cell (XLC) structure configured to store multi-bit data in one memory cell according to a programming method.

Figure 2:
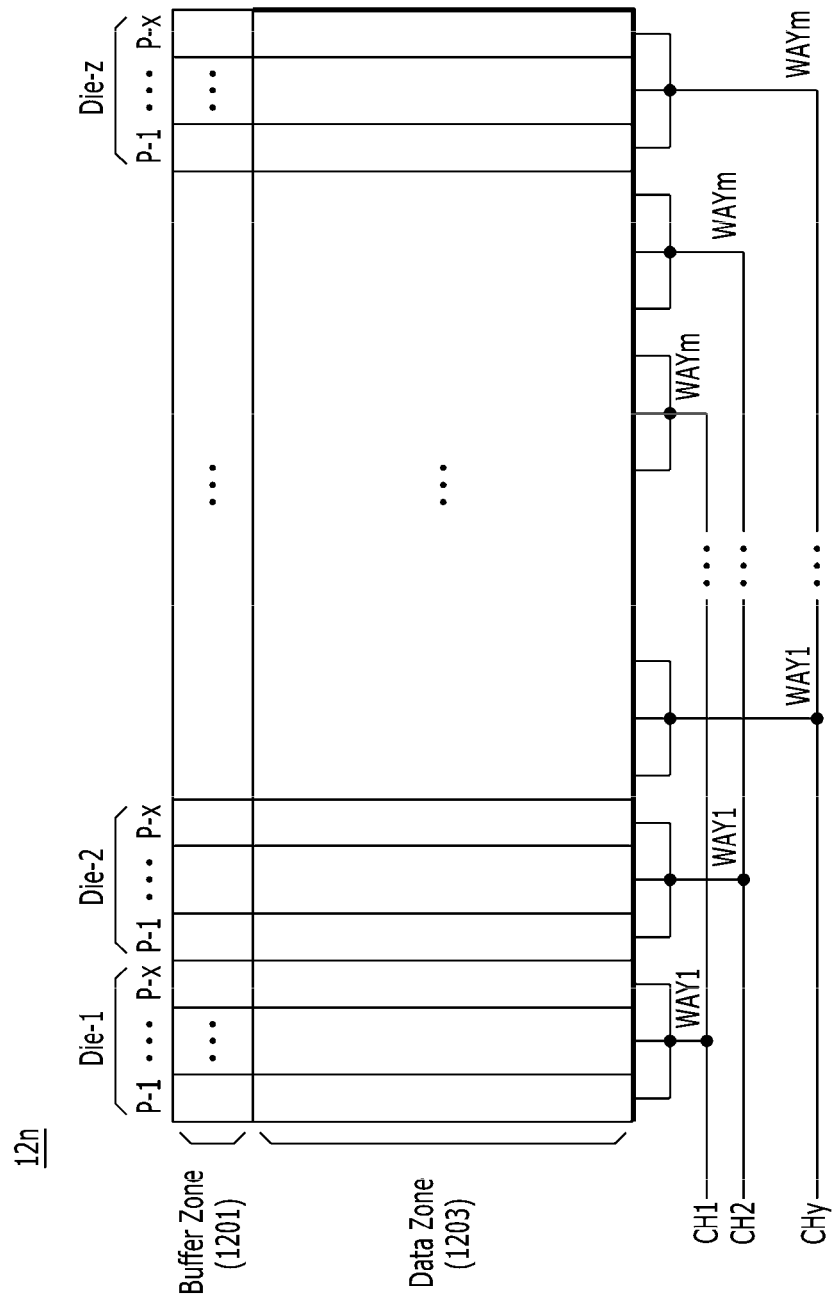
FIG. 2 is a diagram illustrating a storage according to an embodiment of the present disclosure.

FIG. 2 is a diagram illustrating the nonvolatile memory device 12n of FIG. 1 according to an embodiment. Each of the other nonvolatile memory devices in the storage 120 of FIG. 1 may have the same configuration as the nonvolatile memory device 12n shown in FIG. 2.

Referring to FIG. 2, the nonvolatile memory device 12n may include a plurality of dies Die-1 to Die-z, z being a positive integer. Each of the plurality of dies Die-1 to Die-z may include a plurality of planes P-1 to P-x, x being a positive integer.

The plurality of planes P-1 to P-x included in each of the plurality of memory dies Die-1 to Die-z may input and output data through y channels CH1 to CHy and m paths WAY1 to WAYm, y and m being positive integers. FIG. 2 illustrates that m (=z/y) paths share one channel CH and that x planes share one path WAY.

Each of the planes P-1 to P-x may include a plurality of memory blocks and each of the memory blocks may include a plurality of pages.

The controller 110 of FIG. 1 may group the plurality of memory blocks into a plurality of memory block groups based on a set criterion and manage a memory block group as a ZNS, in response to a write request of the host. A ZNS, which is logically and physically divided, may be allocated to each of a plurality of application programs providing write data, the plurality of application programs are driven in the host. A plurality of ZNSs, which have the same size as each other or have different sizes from each other according to the plurality of application programs, may be generated in response to the write request of the host.

In an embodiment, memory blocks included in one ZNS may be simultaneously accessed in a die interleaving manner or a channel interleaving manner. To operate the storage 120 in the die interleaving manner, the controller 110 may constitute a ZNS by selecting memory blocks that are located in the same position or address offset as each other or in different positions or address offsets from each other in the planes P-1 to P-x of each of the dies Die-1 to Die-z.

The nonvolatile memory device 12n may be divided into a buffer zone 1201 in which write data provided from the host is to be temporarily stored and a data zone 1203 to which the write data temporarily stored in the buffer zone 1201 is to be migrated. The nonvolatile memory device 12n may include an over provision (OP) region for a housekeeping operation such as ware leveling. In an embodiment, the buffer zone 1201 may be a portion of the OP region in the nonvolatile memory device 12n. As illustrated in FIG. 2, each of the dies Die-1 to Die-z includes a corresponding portion of the buffer zone 1201 and a corresponding portion of the data zone 1203.

In an embodiment, the buffer zone 1201 may be programmed according to an SLC method which stores 1-bit data in one memory cell or an XLC method which stores multi-bit data, for example, 2- or more bit data, in one memory cell.

In an embodiment, the data zone 1203 may be programmed according to the XLC method which stores multi-bit data, for example, 2- or more bit data, in one memory cell.

Figure 3:
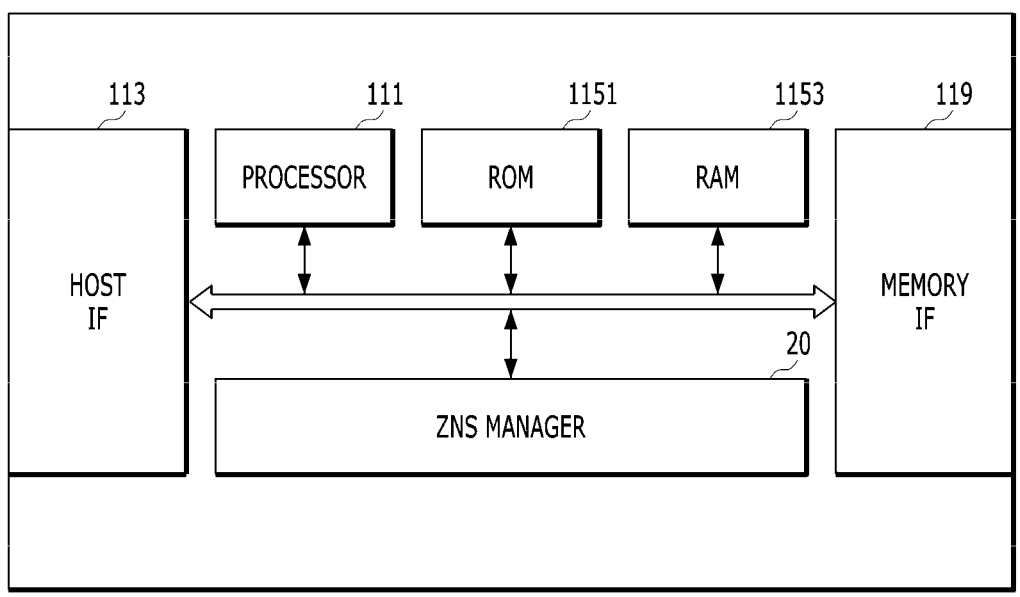
FIG. 3 is a diagram illustrating a controller according to an embodiment of the present disclosure.

FIG. 3 is a diagram illustrating the controller 110 of FIG. 1 according to an embodiment.

Referring to FIG. 3, the controller 110 may include a processor 111, a host interface (IF) 113, a ROM 1151, a RAM 1153, a memory interface (IF) 119, and a ZNS manager 20.

The processor 111 may be configured to transmit various control information, which are required for performing a read or write operation on the storage 120, to the host interface 113, the RAM 1153, the memory interface 119, and the ZNS manager 20. In an embodiment, the processor 111 may operate according to firmware provided for performing various operations of the data storage device 10. In an embodiment, the processor 111 may perform a function of a flash translation layer (FTL) for performing garbage collection, address mapping, wear leveling, and the like in order to manage the storage 120, a function of performing an error check and correction (ECC) operation on data read from the storage 120, and so on.

When a write command and a logical address are received from the host, the processor 111 may control a write operation in which a physical address corresponding to the logical address is allocated and write data is written in a storage region of the storage 120 that corresponds to the physical address.

When a read command and a logical address are received from the host, the processor 111 may control a read operation in which a physical address corresponding to the logical address is searched for and data is read out from a storage region of the storage 120 that corresponds to the physical address.

The host interface 113 may receive a request and a clock signal from the host and provide a communication channel for performing data input and output. In particular, the host interface 113 may provide a physical connection between the host and the data storage device 10. The host interface 113 may provide interfacing between the data storage device 10 and the host according to a bus format of the host. The bus format of the host may include at least one among standard interface protocols such as a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI-express (PCI-E) protocol, a universal flash storage (UFS) protocol, and so on.

Program codes, for example, firmware or software, required for performing an operation of the controller 110 may be stored in the ROM 1151, and code data and the like used by the program codes may be stored in the ROM 1151.

Data required for performing an operation of the controller 110 may be stored in the RAM 1153, and data generated through the operation of the controller 110 may be stored in the RAM 1153.

The memory interface 119 may provide a communication channel for signal transmission and reception between the controller 110 and the storage 120. The memory interface 119 may write data in the storage 120 under the control of the processor 111. The memory interface 119 may provide data read out from the storage 120 to the host.

The ZNS manager 20 may temporarily store (buffer) write data in at least one sub buffer zone, which is allocated as a portion of the buffer zone 1201 of FIG. 2, in response to a write request of the host. In an embodiment, the write data may be divided into one or more segments, and one or more sub buffer zones of the buffer zone 1201 may be allocated in segment size units of the write data. For example, the write data may be buffered in the one or more sub buffer zones in the segment size units. When the one or more sub buffer zones used for buffering the write data are closed, the ZNS manager 20 may open a ZNS corresponding to a size of the write data in the data zone 1203, migrate the one or more segments of the write data stored in the one or more sub buffer zones of the buffer zone 1201 to the opened ZNS in the data zone 1203.

Here, an "opened" memory region may mean a memory region precharged with an operation voltage to program data, and a "closed" memory region may mean an operation voltage from a memory region from which an operation voltage is discharged. In another respect, the "opened" memory region may mean a memory region including an unprogrammed page, and the "closed" memory region may mean a memory region in which all pages are programmed.

Therefore, when the one or more sub buffer zones used for buffering the write data are closed, all pages of the one or more sub buffer zones are programmed with the write data. When the ZNS corresponding to the size of the write data is opened, all pages of the ZNS are empty in order to program the write data therein.

In an embodiment, the ZNS manager 20 may be implemented with the processor 111 or a processor that is different from the processor 111.

Figure 4:
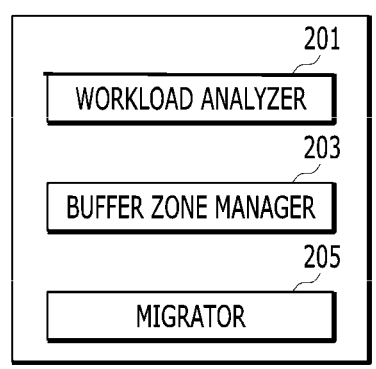
FIG. 4 is a diagram illustrating a ZNS manager according to an embodiment of the present disclosure.

FIG. 4 is a diagram illustrating the ZNS manager 20 of FIG. 3 according to an embodiment.

Referring to FIG. 4, the ZNS manager 20 may include a workload analyzer 201, a buffer zone manager 203, and a migrator 205.

The workload analyzer 201 may determine whether or not a write request of the host is a random data write request or a sequential data write request in response to the write request of the host. The write request of the host may include a write command, a start logical address, an offset, and write data. The workload analyzer 201 may determine a workload of the write request according to a length (size) of the write data determined based on the start logical address and the offset, but embodiments are not limited thereto.

The buffer zone manager 203 may allocate at least one sub buffer zone in the buffer zone 1201 based on a workload determination result of the workload analyzer 201. In an embodiment, when the write request is determined to be the random data write request as the workload determination result, the buffer zone manager 203 may allocate a portion of the buffer zone 1201 as the at least one sub buffer zone so that the write data is written according to a first write (or program) method. When the write request is determined to be the sequential data write request as the workload determination result, the buffer zone manager 203 may allocate a portion of the buffer zone 1201 as the at least one sub buffer zone so that the write data is written according to a second write (or program) method.

In an embodiment, the first write (or program) method may be an SLC method of storing 1-bit data in one memory cell, and the second write (or program) method may be an XLC method of storing multi-bit data, for example, 2- or more bit data, in one memory cell, but embodiments are not limited thereto.

A size of the at least one sub buffer zone required to buffer the write data having the same size may be changed according to whether the write data is written according to the first write method or the second write method.

In an embodiment, since a portion of the nonvolatile memory device 12n is allocated as the buffer zone 1201 as shown in FIG. 2, it is efficient to allocate the at least one sub buffer zone to be accessed in the die interleaving manner. That is, the at least one sub buffer zone may be disposed in at least one die in the nonvolatile memory device 12n. The number of sub buffer zones allocated to buffer the write data may correspond to the number of segments of the write data.

Figure 5:
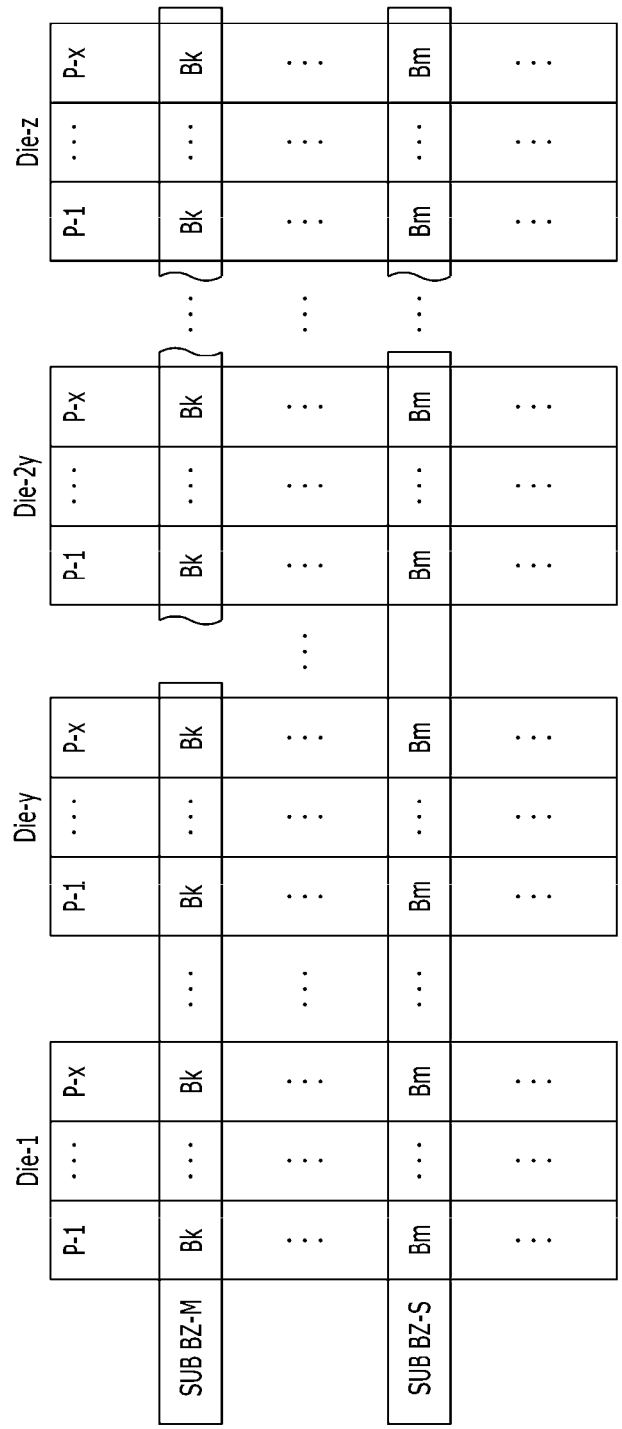
FIG. 5 is a conceptual diagram explaining a method of allocating a buffer zone according to an embodiment of the present disclosure.

FIG. 5 is a conceptual diagram explaining a method of allocating a sub buffer zone in a buffer zone according to an embodiment. The buffer zone shown in FIG. 5 may correspond to the buffer zone 1201 shown in FIG. 2.

As shown in FIG. 2, the nonvolatile memory device 12n including the buffer zone 1201 may include the plurality of dies Die-1 to Die-z. Each of the dies Die-1 to Die-z may include the plurality of planes P-1 to P-x. The plurality of dies Die-1 to Die-z may input and output data through y channels. Each of the planes P-1 to P-x may include a plurality of memory blocks, and each of the memory blocks may include a plurality of pages.

The buffer zone manager 203 of FIG. 4 may allocate sub buffer zones SUB BZ-M and SUB BZ-S in the buffer zone 1201 disposed in the plurality of dies Die-1 to Die-z based on an attribute of the write data, for example, according to whether the write data is random data or sequential data, which is determined based on a length of the write data, in response to the write request of the host. In an embodiment, the buffer zone manager 203 may allocate the sub buffer zones SUB BZ-M and SUB BZ-S to be accessed in the die interleaving manner. The sub buffer zone SUB BZ-S is a single-bit sub buffer zone in which one-bit data is stored in one memory cell, and the sub buffer zone SUB BZ-M is a multi-bit sub buffer zone in which multi-bit data is stored in one memory cell. Each of the sub buffer zone SUB BZ-S and the sub buffer zone SUB BZ-M may include memory blocks located in the same position or in different positions in the planes P-1 to P-x of each of the dies Die-1 to Die-z.

In an embodiment, when the write data is determined to be random data, the buffer zone manager 203 may allocate one region of the buffer zone 1201 as the single-bit sub buffer zone SUB BZ-S, so that the write data is written in the first write method, i.e., the SLC method of storing 1-bit data in one memory cell. When the write data is determined to be sequential data, the buffer zone manager 203 may allocate one region of the buffer zone 1201 as the multi-bit sub buffer zone SUB BZ-M, so that the write data is written in the second write method, i.e., the XLC method of storing multi-bit data in one memory cell.

Referring back to FIG. 4, the migrator 205 may allocate or open a ZNS corresponding to the length of the write data in the data zone 1203 shown in FIG. 2 when all the segments of the write data are buffered in the allocated sub buffer zone and thus the allocated sub buffer zone is closed. Then, the migrator 205 may migrate the segments of the write data that have been buffered in the closed sub buffer zone to the ZNS. When the write data is fully migrated in segment units to the ZNS, the migrator 205 may switch the ZNS into a close state.

In the present technology, a ZNS allocated according to an application program of the host may not have a fixed size and may have a size adaptively changing based on the length of the write data.

When a large number of ZNSs having large capacity are in an open state, the power efficiency may be degraded and data may also be lost in sudden power off (SPO). In the present technology, the write data may be buffered in an SLC buffer, e.g., the sub buffer zone SUB BZ-S, or an XLC buffer, e.g., the sub buffer zone SUB BZ-M, and the ZNS may be opened in the data zone 1203 and the buffered data may be migrated to the ZNS after the data buffering is completed. Accordingly, only the ZNS on which a program operation is actually performed may be opened and operated.

Accordingly, according to an embodiment of the present disclosure, ZNSs having capacities corresponding to zone data having various lengths may be allocated so that the performance of a data storage device may be improved.

Figure 6:
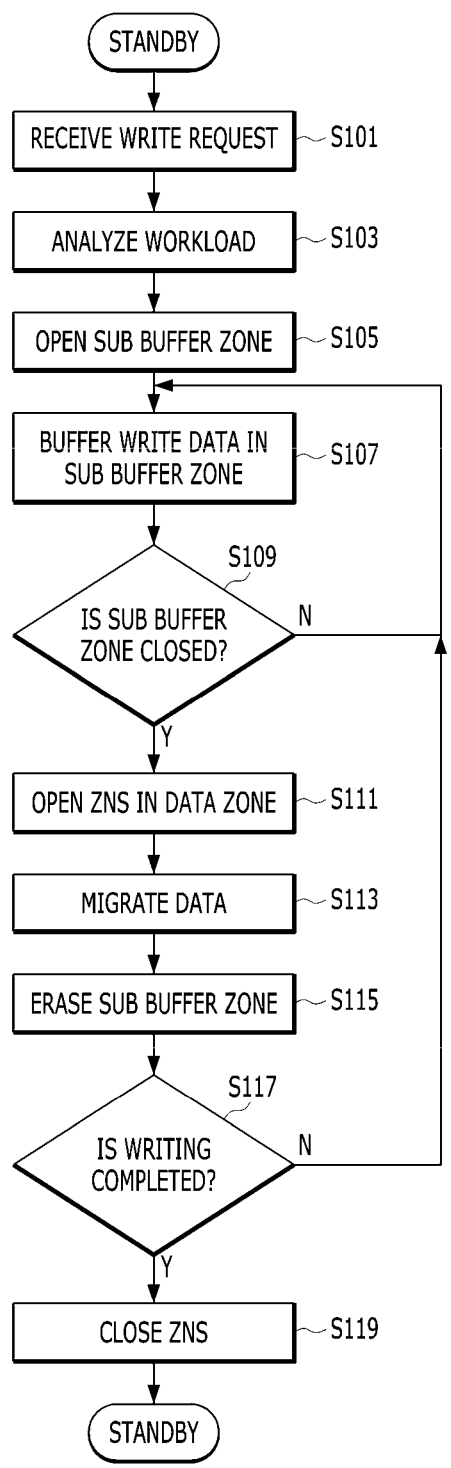
FIG. 6 is a flowchart describing an operating method of a data storage device according to an embodiment of the present disclosure.

FIG. 6 is a flowchart explaining an operating method of a data storage device according to an embodiment. The data storage device of FIG. 6 may correspond to the data storage device 10 of FIG. 1 and thus the operation method will be described with reference to FIGS. 1, 2, and 4.

Referring to FIG. 6, at S101, the controller 110 receives a write request from a host in which a plurality of application programs are driven. The controller 110 analyzes a workload of the write request in response to the write request at S103. In an embodiment, the write request may include a write command, a start logical address, an offset, and write data. The controller 110 may determine the workload of the write request based on a length (size) of the write data that is determined based on the start logical address and the offset included in the write request, but embodiments are not limited thereto.

The controller 110 may allocate one or more sub buffer zones in the buffer zone 1201 based on a workload determination result at S105. In an embodiment, when the write request is determined to be a random write request as the workload determination result, the controller 110 may allocate the sub buffer zone SUB BZ-S in the buffer zone 1201 so that the write data is written in the first write method, i.e., the SLC method. When the write request is determined to be a sequential write request as the workload determination result, the controller 110 may allocate the sub buffer zone SUB BZ-M in the buffer zone 1201 so that the write data is written in the second write method, i.e., the XLC method. Each of the sub buffer zone SUB BZ-S and the sub buffer zone SUB BZ-M may include the one or more sub buffer zones.

In an embodiment, the controller 110 may allocate the one or more sub buffer zones to be accessed in the die interleaving manner.

When the one or more sub buffer zones are allocated in the buffer zone 1201, the controller 110 may divide the write data into one or more segments respectively corresponding to sizes of the one or more sub buffer zones and buffer each of the one or more segments of the write data in a corresponding one of the one or more sub buffer zones at S107.

After that, the controller 110 may determine whether or not the corresponding sub buffer zone is closed at S109. For example, the controller 110 may determine whether all pages of the corresponding sub buffer zone are programmed with the corresponding segment of the write data after the programming is completed. When it is determined at S109 that the corresponding sub buffer zone is not closed, the process goes back to S107 and the controller 110 may continuously perform the process of buffering the write data. When the corresponding sub buffer zone is determined to be closed at S109, the controller 110 may allocate a ZNS corresponding to a size of the write data in the data zone 1203 at S111. That is, the controller 110 may open the ZNS in the data zone 1203.

In an embodiment, the controller 110 may open the ZNS when a first one of the one or more sub buffer zone is closed. In another embodiment, the controller 110 may open the ZNS after the buffering of all of the one or more segments buffered in the one or more sub buffer zones is completed.

After the ZNS is opened, the controller 110 may migrate the segment of the write data buffered in the corresponding sub buffer zone to the ZNS at S113, and perform an erase operation on the corresponding sub buffer zone at S115. In an embodiment, the controller 110 buffers a next segment corresponding to another one of the one or more sub buffer zones when the segment of the write data buffered in the corresponding sub buffer zone is migrated to the ZNS.

The controller 110 may determine whether or not all the segments of the write data are stored in the ZNS at S117. When it is determined at S117 that the writing of the write data is not completed, the process goes back to S107 so that the controller 110 continuously buffers another one of the segments of the write data in a corresponding one of the one or more sub buffer zones. When it is determined at S117 that the writing of the write data is completed, the controller 110 may close the opened ZNS at S119 and wait for a next request.

According to the present technology, in the data storage device 10 which stores write data (zone data) provided from the host in zone units, the controller 110 may vary the size of the ZNS according to the size of the zone data.

Accordingly, the controller 110 may flexibly manage the ZNS regardless of the capacity of the data storage device 10 employed in the host.

The controller 110 may allocate the ZNS based on the size of the zone data to be written in the storage 120 to prevent an undesired data storage region from being driven or opened in the storage 120. Accordingly, it is possible to improve the power efficiency of the data storage device 10.

Figure 7:
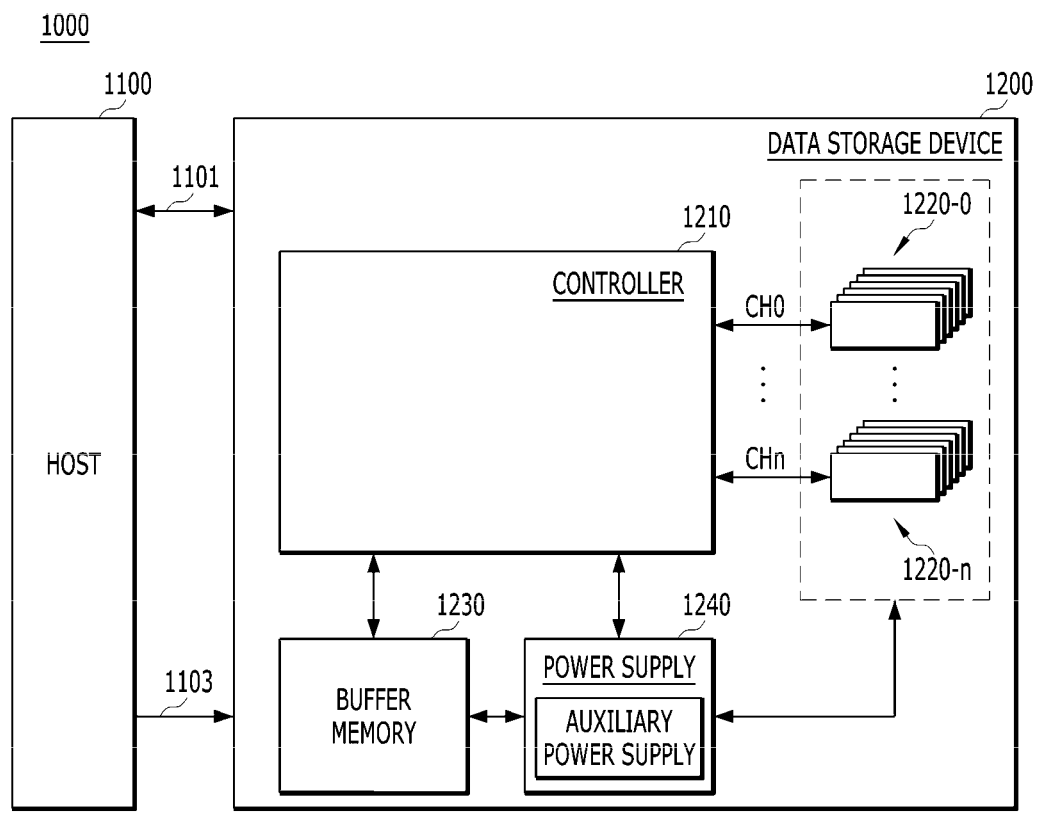
FIG. 7 is a diagram illustrating a data storage system in accordance with an embodiment.

FIG. 7 is a diagram illustrating a data storage system 1000 in accordance with an embodiment.

Referring to FIG. 7, the data storage system 1000 may include a host device 1100 and a data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. Although not shown, the controller 1210 may include a host interface unit, a control unit, a random access memory used as a working memory, an error correction code (ECC) unit, and a memory interface unit. In an embodiment, the controller 1210 may configured as the controller 110 shown in FIGS. 1, 3, and 4.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software driven in the data storage device 1200.

The buffer memory device 1230 may temporarily store data to be stored in at least one of the nonvolatile memory devices 1220-0 to 1220-n. Further, the buffer memory device 1230 may temporarily store data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n under the control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n, and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 8:
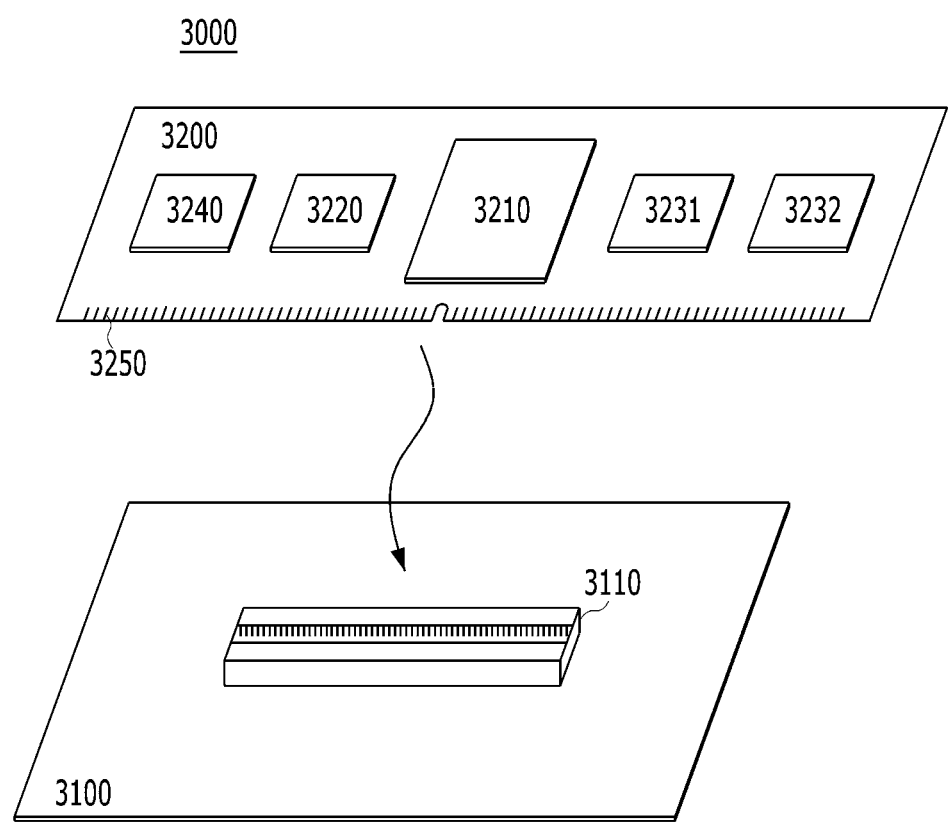
FIG. 8 is a diagram illustrating a data processing system in accordance with an embodiment.

FIG. 8 is a diagram illustrating a data processing system 3000 in accordance with an embodiment. Referring to FIG. 8, the data processing system 3000 may include a host device 3100 and a memory system 3200.

The host device 3100 may be configured in the form of a board, such as a printed circuit board. Although not shown, the host device 3100 may include internal function blocks for performing functions of the host device 3100.

The host device 3100 may further include a connection terminal 3110, such as a socket, a slot, a connector, or the like. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1, 3, and 4.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 under the control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 under the control of the controller 3210.

The connection terminal 3250 may be coupled to the connection terminal 3110 of the host device 3100. Through the connection terminal 3110 and the connection terminal 3250, signals such as commands, addresses, data, and so forth, and power may be transferred between the host device 3100 and the memory system 3200. The connection terminal 3250 may be configured as one or more of various types of connectors depending on an interface scheme between the host device 3100 and the memory system 3200. The connection terminal 3250 may be disposed on a side of the memory system 3200, as shown in FIG. 8.

Figure 9:
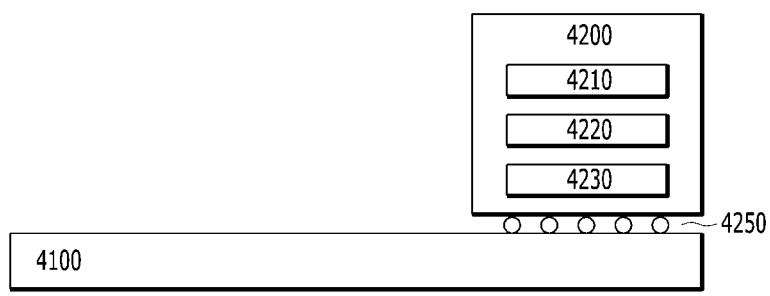
FIG. 9 is a diagram illustrating a data processing system in accordance with an embodiment.

FIG. 9 is a diagram illustrating a data processing system 4000 in accordance with an embodiment. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing functions of the host device 4100.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1, 3, and 4.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 under the control of the controller 4210.

The nonvolatile memory device 4230 may be used as a storage medium of the memory system 4200.

Figure 10:
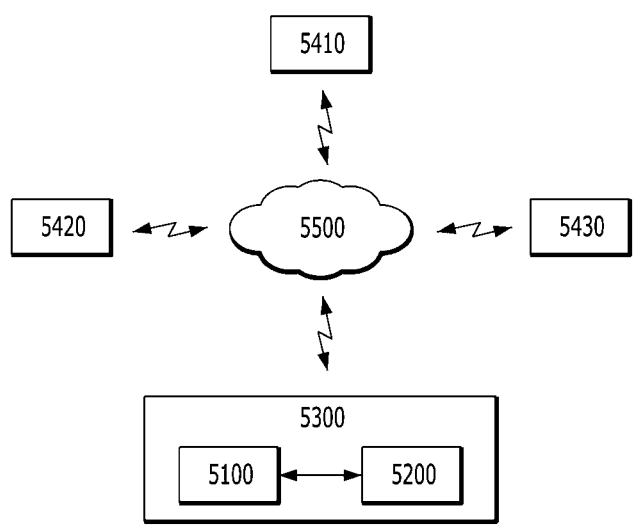
FIG. 10 is a diagram illustrating a network system including a data storage device in accordance with an embodiment.

FIG. 10 is a diagram illustrating a network system 5000 in accordance with an embodiment. Referring to FIG. 10, the network system 5000 may include a server system 5300 and a plurality of client systems 5410, 5420, and 5430, which are coupled through a network 5500.

The server system 5300 may serve data in response to requests from the plurality of client systems 5410 to 5430. For example, the server system 5300 may store data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 7, the memory system 3200 shown in FIG. 8, or the memory system 4200 shown in FIG. 9.

Figure 11:
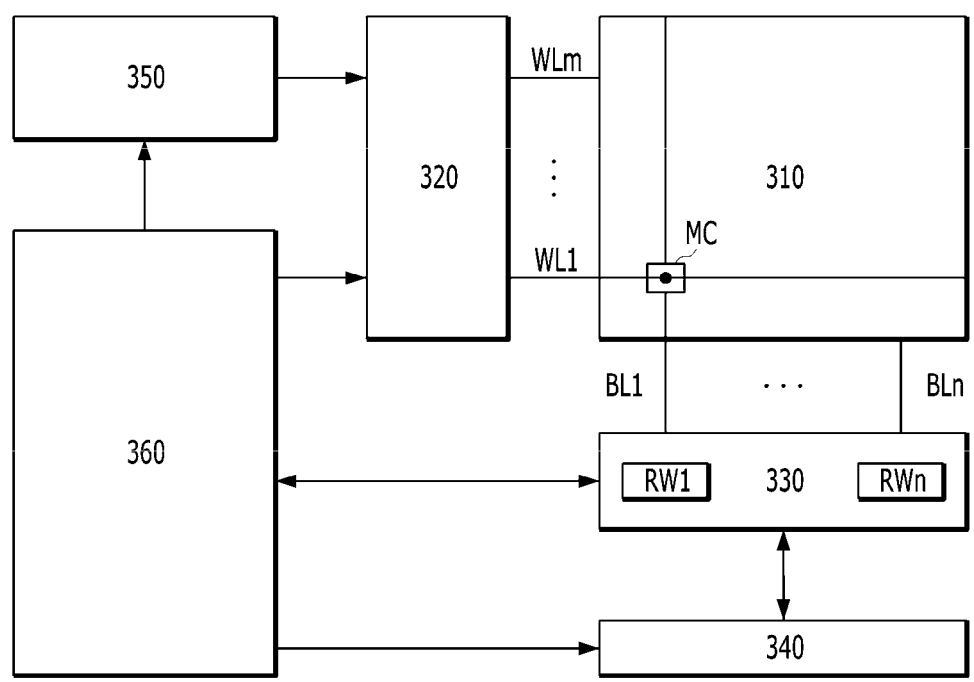
FIG. 11 is a block diagram illustrating a nonvolatile memory device included in a data storage device in accordance with an embodiment.

FIG. 11 is a block diagram illustrating a nonvolatile memory device 300 in accordance with an embodiment. The nonvolatile memory device 300 may be included in a data storage device such as the data storage device 10 of FIG. 1.

Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may include a three-dimensional memory array. The three-dimensional memory array may have a stacked structure in a direction perpendicular to a flat surface of a semiconductor substrate. Moreover, the three-dimensional memory array may include NAND strings in which memory cells are stacked perpendicular to the flat surface of the semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array, memory cells are arranged in horizontal and vertical directions with respect to the flat surface of the semiconductor substrate. The memory cells may be variously spaced to provide different degrees of integration The row decoder 320 may be coupled with the memory cell array 310 through the word lines WL1 to WLm. The row decoder 320 may operate under the control of the control logic 360. The row decoder 320 may decode an address provided by an external device (not shown). The row decoder 320 may select and drive one of the word lines WL1 to WLm based on a decoding result. For instance, the row decoder 320 may provide word line voltages, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate under the control of the control logic 360. The data read/write block 330 may operate as a write driver or a sense amplifier according to an operation mode. For example, the data read/write block 330 may operate as a write driver for storing data provided by the external device in the memory cell array 310 in a write operation. For another example, the data read/write block 330 may operate as a sense amplifier for sensing data read out from the memory cell array 310 in a read operation.

The column decoder 340 may operate under the control of the control logic 360. The column decoder 340 may decode an address provided by the external device. The column decoder 340 may couple the read/write circuits RW1 to RWn of the data read/write block 330 with data input/output lines or data input/output buffers based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300 based on control signals provided by the external device. For example, the control logic 360 may control read, write, and erase operations of the nonvolatile memory device 300.

The above described embodiments of the present disclosure are intended to illustrate and not to limit the present invention. Various alternatives and equivalents thereof are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage device comprising:
   a storage including a buffer zone and a data zone; and
   a controller configured to exchange data with the storage by allocating at least one zone namespace (ZNS) in the data zone of the storage, a ZNS being a data storage region that is physically and logically divided and allocated to each of a plurality of application programs driven in a host,
   wherein the controller is configured to:
   open one or more sub buffer zones in the buffer zone of the storage
   divide first write data transmitted from the host into one or more segments respectively corresponding to sizes of the one or more sub buffer zones;
   buffer each of the one or more segments of the first write data in a corresponding one of the one or more sub buffer zones;

open a ZNS, which has a size corresponding to a length of the first write data in the data zone of the storage after buffering all of the one or more segments of the first write data in the one or more sub buffer zones; and migrate each of the one or more segments buffered in the one or more sub buffer zones to the opened ZNS.

2. The data storage device of claim 1, wherein the controller is configured to determine a programming method of the one or more sub buffer zones based on an attribute of the first write data, and the programming method is determined based on a number of bits of data stored in each of memory cells included in the one or more sub buffer zones.

3. The data storage device of claim 2, wherein the controller is configured to determine the attribute of the first write data according to whether the first write data is random data or sequential data.

4. The data storage device of claim 3, wherein the controller is configured to allocate the one or more sub buffer zones so that each of the memory cells stores 1-bit data when the first write data is the random data.

5. The data storage device of claim 3, wherein the controller is configured to allocate the one or more sub buffer zones so that each of the memory cell stores multi-bit data when the first write data is the sequential data.

6. The data storage device of claim 1, wherein the data zone is configured in such a manner that each memory cell included in the data zone stores multi-bit data.

7. The data storage device of claim 1, wherein the storage includes a plurality of dies, and the controller is configured to access the storage in a die interleaving manner.

8. The data storage device of claim 1, wherein the controller is further configured to perform an erase operation on each of the one or more sub buffer zones after a corresponding segment of the first write data buffered in said each of the one or more sub buffer zones is migrated to the opened ZNS and then buffer a next segment corresponding to next write data.

9. An operating method of a data storage device which includes a controller and a storage including a buffer zone and a data zone, the controller configured to exchange data with the storage by allocating at least one zone namespace (ZNS) in the storage, a ZNS being a data storage region that is physically and logically divided and allocated to each of a plurality of application programs driven in a host, the method comprising:

receiving a write request including first write data of an application program from the host;

opening one or more sub buffer zones in the buffer zone of the storage in response to the write request;

dividing the first write data into one or more segments respectively corresponding to sizes of the one or more sub buffer zones;

buffering the one or more segments of the first write data in the one or more sub buffer zones;

opening a ZNS, which has a size corresponding to a length of the first write data, in the data zone of the storage after buffering all of the one or more segments of the first data in the one or more sub buffer zones; and migrating the one or more segments buffered in the one or more sub buffer zones to the opened ZNS.

10. The method of claim 9, further comprising:

determining an attribute of the first write data; and determining a programming method of the one or more sub buffer zones based on the attribute, wherein the programming method is determined based on a number of bits of data stored in each of memory cells included in the one or more sub buffer zones.

11. The method of claim 10, wherein the determining of the attribute includes determining whether or not the first write data is random data or sequential data.

12. The method of claim 11, wherein the determining of the programming method includes allocating the one or more sub buffer zones so that each of the memory cells stores 1-bit data when the first write data is the random data.

13. The method of claim 11, wherein the determining of the programming method includes allocating the one or more sub buffer zones so that each of the memory cells stores multi-bit data when the first write data is the sequential data.

14. The method of claim 9, wherein the data zone is configured in such a manner that each memory cell included in the data zone stores multi-bit data.

15. The method of claim 9, wherein the storage includes a plurality of dies, and the controller is configured to access the storage in a die interleaving manner.

16. The method of claim 9, further comprising performing an erase operation on each of the one or more sub buffer zones after a corresponding segment of the first write data buffered in said each of the one or more sub buffer zones is migrated to the opened ZNS, and then buffering a next segment corresponding to next write data.

* * * * *